(12) United States Patent
Mustonen et al.

(10) Patent No.: US 7,660,593 B2
(45) Date of Patent: Feb. 9, 2010

(54) METHOD FOR COMBINING MEDIA RECORDS IN A CELLULAR NETWORK TERMINAL DEVICE AND A CELLULAR NETWORK TERMINAL DEVICE

(75) Inventors: Mika P. Mustonen, Ii (FI); Markku Rytivaara, Oulu (FI); Minna Karukka, Oulu (FI)

(73) Assignee: Nokia Corporation, Espoo (FI)

( * ) Notice: Subject to any disclaimer, the term of this patent is extended or adjusted under 35 U.S.C. 154(b) by 919 days.

(21) Appl. No.: 11/026,885

(22) Filed: Dec. 30, 2004

(65) Prior Publication Data

US 2005/0157851 A1    Jul. 21, 2005

(30) Foreign Application Priority Data

Dec. 31, 2003   (FI)   .................................. 20031928

(51) Int. Cl.
  *H04W 4/00*   (2006.01)
(52) U.S. Cl. .................. 455/466; 455/412.1; 455/412.2; 455/425; 455/550.1
(58) Field of Classification Search ................. 455/466, 455/412.1, 412.2, 425, 550.1
See application file for complete search history.

(56) References Cited

U.S. PATENT DOCUMENTS

| | | | | |
|---|---|---|---|---|
| 5,694,461 | A * | 12/1997 | Lee | 379/196 |
| 6,975,203 | B2 * | 12/2005 | Brookbank et al. | 340/5.26 |
| 7,275,243 | B2 * | 9/2007 | Gibbons et al. | 717/159 |
| 7,340,157 | B2 * | 3/2008 | Chen et al. | 386/125 |
| 2002/0194200 | A1 * | 12/2002 | Flank et al. | 707/104.1 |
| 2003/0027604 | A1 * | 2/2003 | Hayashi | 455/567 |
| 2004/0096200 | A1 * | 5/2004 | Chen et al. | 386/125 |
| 2005/0177792 | A1 * | 8/2005 | Awe et al. | 715/740 |
| 2006/0109102 | A1 * | 5/2006 | Gortz et al. | 340/531 |
| 2006/0155732 | A1 * | 7/2006 | Momose et al. | 707/101 |

FOREIGN PATENT DOCUMENTS

EP    1 063 835 A1    12/2000

* cited by examiner

*Primary Examiner*—Joseph H Feild
*Assistant Examiner*—Huy D Nguyen
(74) *Attorney, Agent, or Firm*—Harrington & Smith, PC

(57) ABSTRACT

The invention relates to a method for combining separate media records saved in a cellular network terminal device by means of the numerical keys of the cellular network terminal device. The invention also relates to an application program implementing the method and a cellular network terminal device in which the application program is utilized.

39 Claims, 3 Drawing Sheets

METHOD FOR COMBINING MEDIA RECORDS IN A CELLULAR NETWORK TERMINAL DEVICE AND A CELLULAR NETWORK TERMINAL DEVICE

TECHNICAL FIELD

The invention relates to a method for combining in a cellular network terminal device media records that have been saved in a cellular network terminal device. The invention also relates to a terminal device utilizing the method and a software application utilized in the terminal device.

DESCRIPTION OF THE PRIOR ART

The size of various data processing devices has decreased, and often the devices have also become mobile. One example of such devices is the telephone. Telephones of a fixed network are becoming replaced by various mobile terminal devices used in a cellular network. These terminal devices can process information in a very versatile manner. They can be used to transmit speech, data, written messages, images, videos and combinations of all those listed.

One of the newest ways of using these cellular network terminal devices is the possibility to save various media records, such as text, images, sound and videos. The saved media files can be saved in the memory of the terminal device for later use. Each saving operation creates a separate media record, which has its own identifier by which it can be identified. These identifiers can be searched for and browsed in the terminal device e.g. in a so-called Gallery menu. However, in this way only the identifier of each media record sorted by some sorting criterion is brought onto the display of the terminal device.

FIG. 1 shows as an example a prior art cellular network terminal device 10. It has the Gallery menu 112 on its display 11, from which menu the titles of visible media records can be read. The upper part of the display, reference 110, shows by means of images and text which operation is in use. The sequence numbers of the media records are shown on the left edge of the display 11. In the example of FIG. 1, reference 111 denotes the media record 1. Reference 12 denotes the numerical/alphabetical keyboard of the terminal device.

In the course of time, the number of media records may grow so large that it becomes difficult to handle them. There can also be many similar records or records made of the same object. The user can browse these media records on the small display 11 of the terminal device 10. From the user's point of view it would then be desirable that the existing media records could be combined into larger entities, which would make it easier to handle them. However, such a combining procedure has not been available for use in a cellular network terminal device.

SUMMARY OF THE INVENTION

It is the purpose of the present invention to provide a new method and arrangement by means of which it is possible to combine and process media records saved in a cellular network terminal device with the same terminal device by which the media records have been created.

The objectives of the invention are achieved by an arrangement and procedure in which in a menu on the display of the terminal device, such as the Gallery menu, two or more media records can be combined into a larger media record by using the keys of the terminal device.

The invention has the advantage that two media records saved in a cellular network terminal device can be combined into a larger entity with the keys of the terminal device.

Another advantage of the invention is that many consecutive, saved media records can be combined into one media record with the keys of the terminal device.

A further advantage of the invention is that any arbitrarily selectable media records can be combined into one media record with the keys of the terminal device.

Yet another advantage of the invention is that the number of media records is reduced, whereby it is easier to control and use them.

The method, terminal device and software means according to the invention are characterized in what is set forth in the independent claims.

Some preferred embodiments of the invention are presented in the dependent claims.

The basic idea of the invention is the following: The media records saved in the cellular network terminal device can be browsed in a menu visible on the display of the terminal device, for example in the so-called Gallery menu. Each media record is provided with a unique identifier, such as its sequence number. The media record visible in the Gallery menu can be selected for playing, for example, by pressing the sequence number assigned to the media record on the keyboard of the terminal device. In the procedure according to the invention, the corresponding numbers of two media records to be combined are pressed simultaneously. This procedure gives the user a possibility to combine the selected media records. When the user's permission has been given, these two media records are combined into one new, larger media record.

If there are other media records between these two media records, all media records that remain between them can be combined into the same new media record by pressing the two selected keys simultaneously for a sufficiently long time. If three or more media records should be combined, it can be done in the following manner. The first media record to be saved is first selected with a numerical key of the terminal device, keeping it continuously selected, whereafter the numerical keys of other media records to be combined are pressed in succession. Freeing the first numerical key starts the final combining in a manner described above.

BRIEF DESCRIPTION OF THE DRAWINGS

In the following, the invention will be described in more detail. Reference will be made to the accompanying figures, in which.

DETAILED DESCRIPTION OF THE INVENTION

Figure 1:
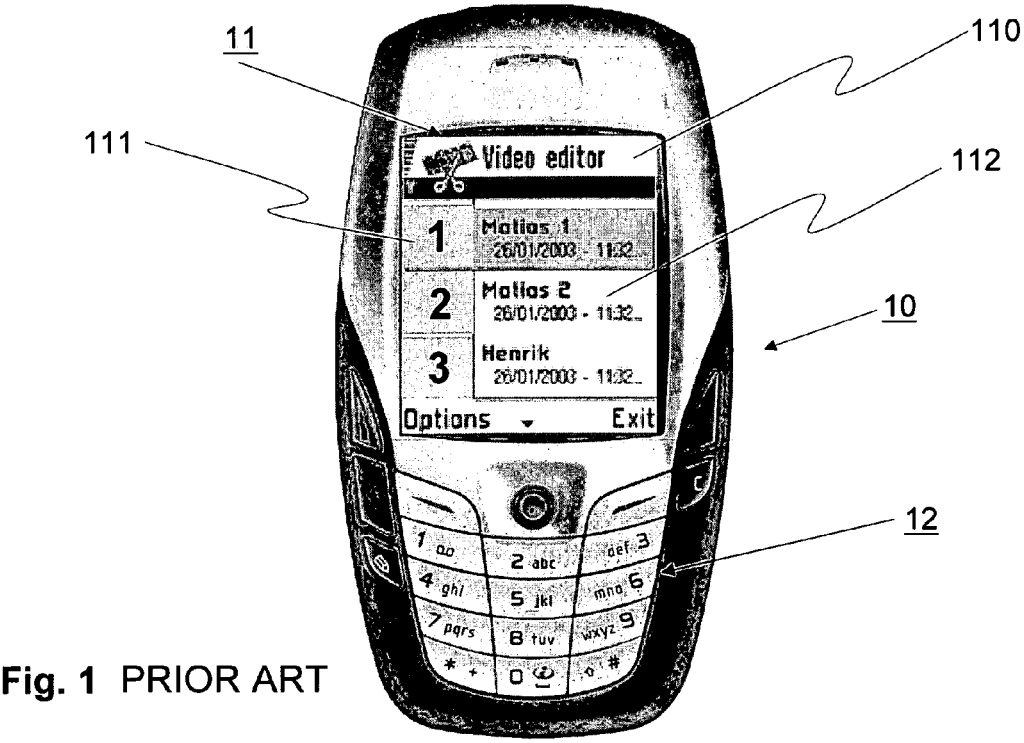
FIG. 1 shows an example of a prior art cellular network terminal device, which has the Gallery menu on its display.

FIG. 1 was discussed in connection with the description of the prior art.

Figure 2:
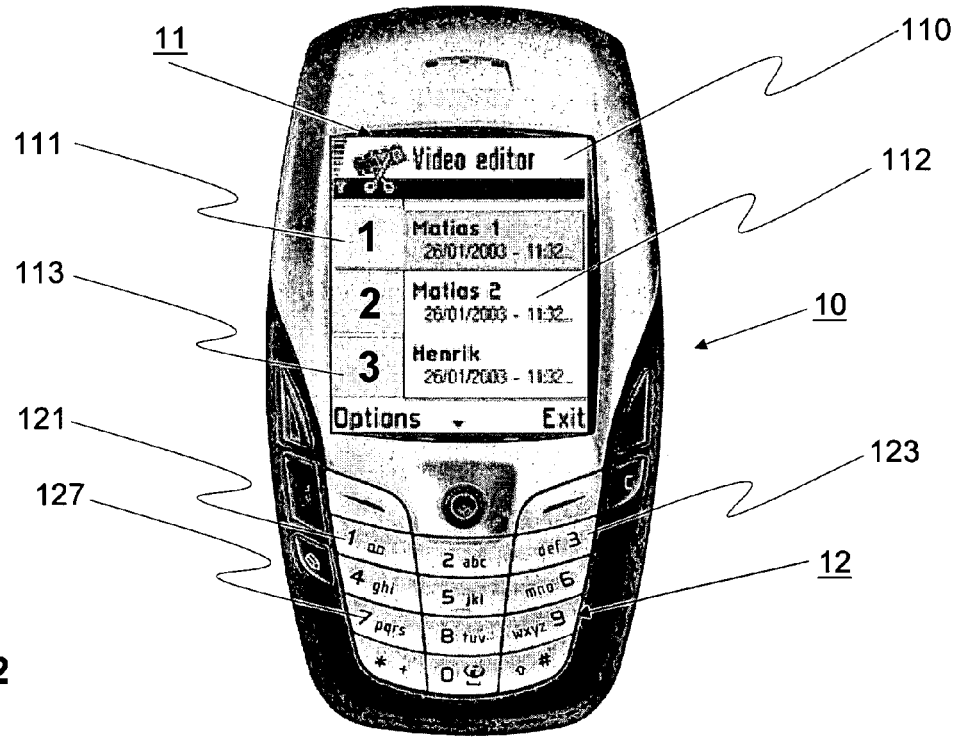
FIG. 2 shows an example of the parts of the terminal device used in combining the media records in the Gallery menu.

FIG. 2 shows how the invention can be applied in a terminal device 10, in which the mechanical functions as such comply with the prior art. The terminal device 10 has a display 11 with the Gallery menu 112 with its clarifying texts and titles 110.

The running number, reference 111, associated with the first media record of the Gallery menu 112 is shown by way of example on the left edge of the display 11. The media record can be in the form of text, image, sound, video or animation. The mechanical structure of the keyboard 12 complies with the prior art.

In the method according to the invention, each of the running numbers associated with the media record is in a programmable manner associated with a key 12 of the terminal device 10 corresponding to the same number. Thus in the example of FIG. 2, the key 121 is associated with the sequence number 1 of the menu, reference 111. Similarly the key 123, numerical key 3, is associated with the sequence number three of the menu, and key 127, numerical key 7, with the sequence number seven of the menu.

Combining two media records according to the invention takes place in the following manner. With the reference numbers of FIG. 2, e.g. combining the first record 111 with the third record 113 takes place in the following manner. The terminal device user presses the first numerical key, key 1 in the example of FIG. 2, reference 121. It is also possible to give a first acoustic signal of pressing this key, the acoustic signal being, for example, one beep sound. While keeping the first key 121 pressed down, the user also presses another key, such as numerical key 3 in the example of FIG. 2, reference 123, which numerical key is associated with the media record 113. An acoustic signal can also be given of pressing the second key. This second acoustic signal is advantageously different from the first acoustic signal. It could be a double beep sound, for example. When the keys 121 and 123 have been pressed, the question "Combine?" appears on the display 11 of the terminal device 10, if the first selected numerical key 121 is released. An answer to this can be given with some first key intended for answering YES or some second key intended for answering NO. The YES answer combines the media records 1 and 3 into one entity. The NO answer returns the display to the initial state without performing any combining.

If the first selected numerical key, e.g. numerical key 1, reference 121 in FIG. 2, is not released, but only the second selected numerical key, e.g. numerical key 3, reference 123 in the example of FIG. 2, is released, even a third media record, e.g. media record 7 with numerical key 7, reference 127, can be combined with the same new media record. The second acoustic signal described above is advantageously also given for this new selection. When the numerical key 121, which was selected first, is finally released, a new question appears on the display 11 of the terminal device 10: "Combine selected media records?" The YES answer combines the contents of the media records 1, 3 and 7.

In the second advantageous embodiment of the invention, all the records between the two selected media records are combined into one record. In this embodiment, the first and the last media record are selected by the procedure described above by pressing the numerical keys 1, reference 121 and 7, reference 127, for example. However, in this embodiment the selected keys are kept pressed down for such a length of time that the following question finally appears on the display 11 of the terminal device 10: "Combine all?" In this connection, it is also possible to give a third acoustic signal, which differs from the first and second acoustic signal described above. The third acoustic signal can be a long, continuous beep sound, for example. The YES answer combines all the records between the first and the second selected media record into one new record. In this example, pressing the keys 121 and 127 combines all the media records from number one to number seven. The NO answer returns the initial state of the display without carrying out the combining defined by the keys.

It is also possible to press two or more keys simultaneously. In this connection, simultaneous pressing means that at least two keys are pressed within a certain predetermined time. This time could be 0.5 seconds, for example. If the pressing of the keys is interpreted as simultaneous, a menu opens on the display of the terminal device, from which menu the user can select functions by which the selected media records can be processed before they are combined. Examples of possible functions are fading the beginning and end of the records to be combined, black-and-white effect or reducing the image size.

In the example of FIG. 2, the keyboard of the terminal device is implemented with separate physical keys. However, the invention is not limited to devices according to the keyboard of the terminal device presented. The invention can naturally also be applied in connection with touch-screen and projection displays.

Figure 3:
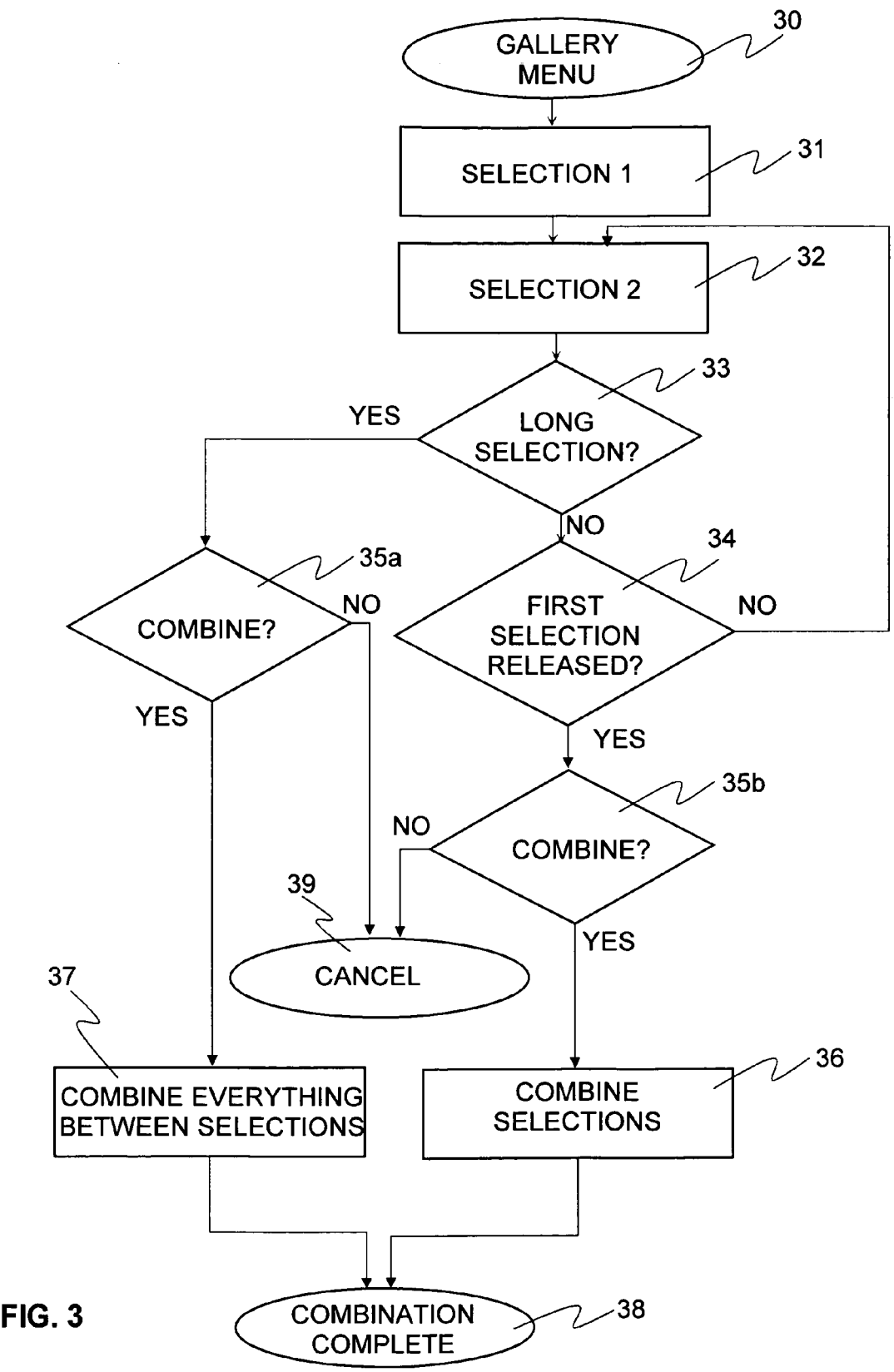
FIG. 3 shows, by way of example, a flow chart of the main steps of the combining method according to the invention.

FIG. 3 is an exemplary flow chart of the main steps of the method for combining media records according to the invention. In step 30, the Gallery menu, for example, is being used on the terminal device. In step 31, the user selects the first record by pressing the first numerical key of the terminal device. The second media record to be combined is selected by pressing the second numerical key at the same time as the first selected numerical key is still kept pressed down, step 32.

In step 33 it is tested whether the user wants to combine all the records between the selected media records or not. The selection is made according to the invention by pressing two selected keys simultaneously for a longer time than a certain predetermined time criterion. The required time can be advantageously determined by the user. If the simultaneous pressing exceeds the decision criterion of a predetermined duration, the process moves to step 35a, in which a question appears on the display of the terminal device: "Combine?" If the user answers NO, the selection made is cancelled in step 39. If the user answers YES, in step 37 all the media records that were between the two selected media records are combined into one new media record. The combining of the media records ends at step 38, in which there is one combined new media record in the memory of the terminal device, containing both the two selected media records and all the media records between them.

If it is found out in step 33 that either of the selections made is released before the set decision criterion of time is fulfilled, the process moves to the testing step 34, where it is tested which of the original selections has been released. If the test gives the result NO, the second selection made later was released. Then it is possible to select a third media record to be combined with the same media record in step 32, because this test result returns the process to step 32. This feedback between the steps 32 and 34 can take place several times, and thus it is possible to combine together a number of media records.

However, sometimes the result in step 34 is YES. This results from releasing the first selection. Then it is once more confirmed in step 35b that the user wants to join all the selected media files into one entity. If the answer is NO, all the selections made in step 39 are cancelled. If the answer is YES, all the selected media files are combined in step 36 into a new, uniform file. The combining of the media records ends at step 38.

The method according to the invention that was described above is advantageously implemented with a software application which has been installed in the cellular network terminal device.

Figure 4:
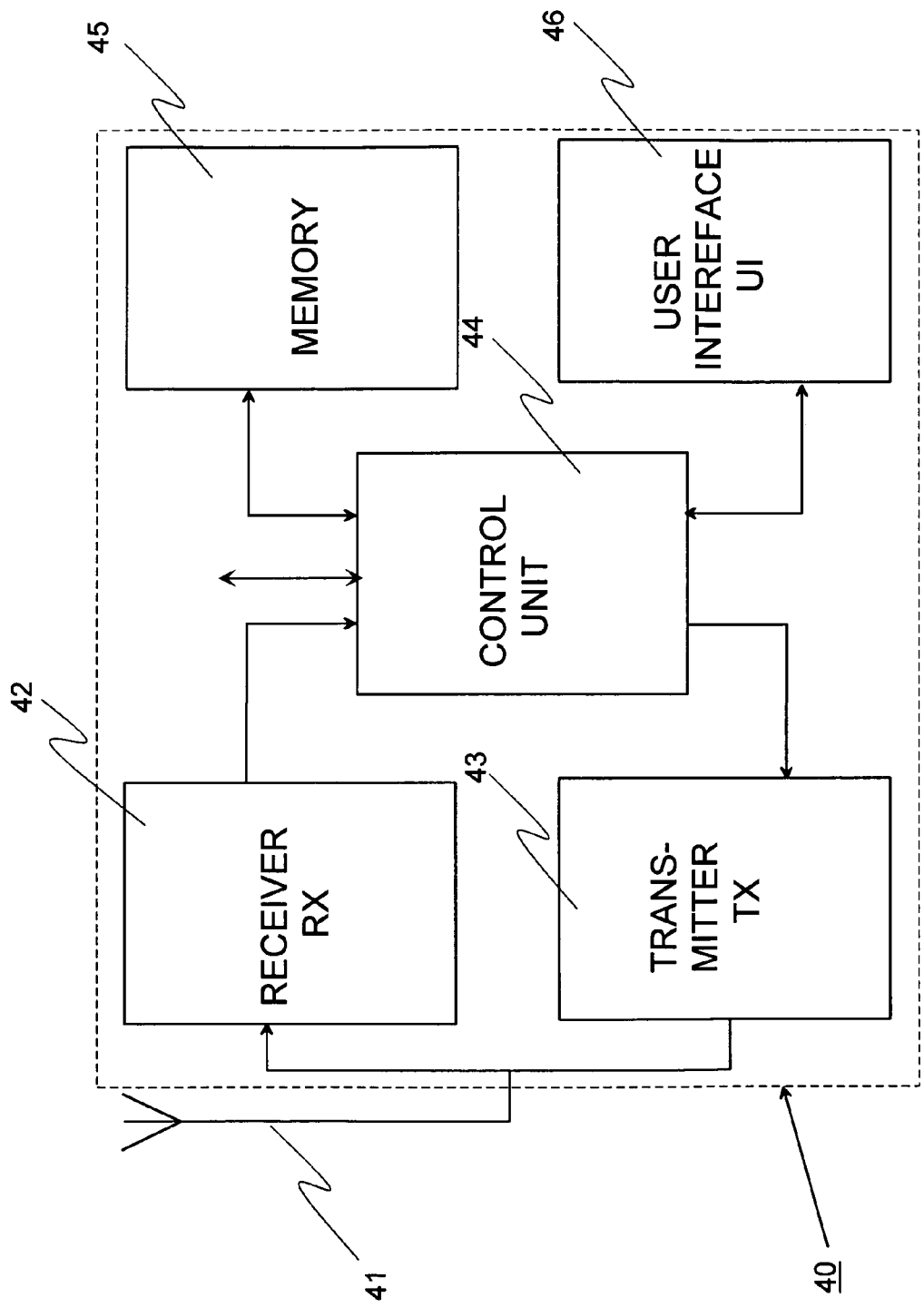
FIG. 4 shows an example of a terminal device utilizing the method according to the invention.

FIG. 4 shows, by way of example, the main parts of a cellular network terminal device 40 in which the method according to the invention is utilized. The terminal device 40 uses an antenna 41 for signal transmission and reception. Reference 42 shows the reception means RX of the terminal device. The receiver RX comprises prior art means for all messages or signals to be received.

Reference 43 denotes the equipment that constitute the transmitter TX of the mobile terminal device. The transmitter means 43 perform on the signal to be transmitted all the signal processing measures needed when working with the cellular network.

In the terminal device the parts that are of essential importance with regard to utilizing the invention are the control unit 44 that controls the operation of the terminal device 40, and the user interface 46 of the terminal device, which comprises a display unit and a keyboard unit. The control unit also controls the memory 45 belonging to the terminal device, into which memory the software application that implements the method according to the invention has been advantageously saved.

The control unit 44 controls the combining of media records according to the invention. The media records to be combined are selected with keys that belong to the user interface UI 46. In this control operation the control unit 44 utilizes the software application according to the invention saved in the memory 45. This software application has been arranged to control the combining of the media record with the method according to FIG. 3.

Some preferred embodiments of the method and device according to the invention have been described above. The invention is not limited to the above described embodiments only. For example the actual media records to be combined can be located in a server. Only the combination work is done in the cellular network terminal device. The inventive idea can be applied in many ways within the scope defined by the claims.

The invention claimed is:

1. A method comprising
switching to a menu for processing media records in a terminal device;
selecting a first media record using a user interface of the terminal device;
selecting at least one second media record using the user interface;
combining the selected media records into one media record using the user interface; and saving the combined selected media records in the terminal device;
where selecting the first media record and selecting the at least one second media record comprises an operation of simultaneously activating at least two user inputs of the user interface.

2. The method according to claim 1, wherein
the first media record is selected by pressing a first numerical key corresponding to the sequential number of said first media record in the user interface of the terminal device, and
the second media record is selected by pressing a second numerical key corresponding to the sequential number of said second media record in the user interface of the terminal device.

3. The method according to claim 2, wherein in response to pressing the second numerical key after pressing the first numerical key
both said numerical keys are kept pressed down, and that after releasing the first numerical key used in when selecting the first media record while still keeping the second numerical key pressed down a terminal device user confirms the media record selections made, and the selected media records are combined and saved as one media record in the terminal device.

4. The method according to claim 2, wherein if the first numerical key is kept pressed and the second numerical key is released, a third media record is selectable to be combined by pressing a third numerical key.

5. The method according to claim 2, wherein if the first and second numerical keys are kept pressed for a predetermined time, the first and the second media records selected with said first and second numerical keys and the media record or media records between the first and the second media records are selected to be combined into the same one media record.

6. The method according to claim 2, wherein pressing the first numerical key gives a first acoustic signal, pressing the second numerical key gives a second acoustic signal, and pressing both numerical keys simultaneously for a predetermined period of time gives a third acoustic signal.

7. The method according to claim 2, wherein if the first and the second numerical key are pressed simultaneously, the first and second media records associated with the first and the second numerical keys are available to be processed with at least one function alternative include in a menu opened on the display of the terminal device before the selected media records are combined.

8. The method according to claim 1, wherein the media record is comprised of at least one of text, image, recording, video or animation.

9. An apparatus comprising means for transmitting and receiving messages, a central processing unit, a memory and a user interface, also comprising
means for switching to a media record processing menu in the apparatus;
means for selecting a first media record with the user interface;
means for selecting at least a second media record with the user interface, and
means for combining the selected media records into one media record with the user interface,
which combination is arranged to be saved in the apparatus,
where said combining means operates in response at least to a simultaneous activation of said means for selecting the first media record and said means for selecting the at least one second media record.

10. The apparatus according to claim 9, which comprises
means for selecting the first media record with a first numerical key corresponding to the sequential number of said first media record in the user interface, and
means for selecting the second media record with a second numerical key corresponding to the sequential number of said second media record in the user interface.

11. The apparatus according to claim 10, which comprises
means for examining whether the first and the second numerical keys are kept pressed;
means for examining which one of the pressed first and second numerical keys is released first;
means for confirming the first media record and the second media record selections made, if the numerical key released first is the first numerical key used in making the first media record selection, and
means for combining the confirmed media record selections and for saving the first and the second media records as one media record in the apparatus.

12. The apparatus according to claim 11, which comprises means for adding a third media record to the combined media records with a third numerical key depression, if the first numerical key has been kept pressed and the second numerical key has been released.

13. The apparatus according to claim 10, which comprises
means for determining a depression time for the first numerical key and the second numerical key, and
means for combining the first and the second media record and a media record or media records between the first and the second media records, if the first and second numerical keys are kept pressed for a period of time longer than a predetermined time.

14. The apparatus according to claim 10, which comprises means for giving a first acoustic signal after pressing the first numerical key, for giving a second acoustic signal after pressing the second numerical key and for giving a third acoustic signal after simultaneously pressing both the first and the second numerical keys for a predetermined period of time.

15. The apparatus according to claim 10, which comprises means for processing media records before they are combined with a function alternative included in a menu opened on the display of the terminal device, if the first and the second numerical key are pressed simultaneously.

16. The apparatus according to claim 9, wherein the media record is comprised of at least one of text, image, recording, video or animation.

17. A memory that stores a software application, the execution of which by a control unit of a terminal device results in operations that comprise:
switching the terminal device to a medial record combining mode;
selecting a first media record using a user interface of the terminal device;
selecting at least a second media record using the user interface of the terminal device, and
combining the selected media records using the user interface of the terminal device and saving the selected media records as one media record in the terminal device,
where selecting the first media record and selecting the at least one second media record comprises an operation of simultaneously activating at least two user inputs of the user interface.

18. The memory according to claim 17, where the operations further comprise:
selecting the first media record with the first numerical key corresponding to the sequential number of said first media record in the user interface of the terminal device, and
selecting the second media record with the second numerical key corresponding to the sequential number of said second media record in the user interface of the terminal device.

19. The memory according to claim 18, where the operations further comprise:
selecting a third media record to be combined together with a first and second media records using a third numerical key, if the first numerical key has been kept selected and the second numerical key has been released.

20. The memory according to claim 18, where the operations further comprise:
determining a selection time for the first numerical key and second numerical key, and
combining the first and the second media record and a media record or media records between the first and second media records, if the first and the second numerical keys are kept selected for a period of time longer than the predetermined time.

21. The memory according to claim 18, where the operations further comprise:
giving a first acoustic signal after pressing the first numerical key, giving a second acoustic signal after pressing the second numerical key and giving a third acoustic signal after simultaneously pressing both the first and the second numerical key for a predetermined period of time.

22. The memory according to claim 18, where the operation further comprise:
processing media records before they are combined with a function alternative included in a menu opened on a display of the terminal device, if the first and the second numerical key are pressed simultaneously.

23. An apparatus comprising:
a user interface comprising a display and a user input device; and
a controller coupled with said user interface and with a memory and configured to respond to a user simultaneously activating at least two user inputs of said user input device to select a first media record, to select at least one second media record, to combine the first media record and the at least one second media record into one combined media record and to store the combined media record into the memory.

24. The apparatus according to claim 23, where first media record is selected by the user activating a first user input of said user input device corresponding to the first media record, and where the at least one second media record is selected by the user activating a second user input of said user input device corresponding to another media record.

25. The apparatus according to claim 24, where said controller is configured to respond to a condition where both the first and the second user inputs are simultaneously activated and then only the first user input is subsequently deactivated, to combine the first media record and the at least one second media record into the one combined media record and to store the one combined media record into the memory.

26. The apparatus according to claim 24, said controller is further configured to respond to a condition where both the first and the second user inputs are simultaneously activated, and then only the second user input is subsequently deactivated, and then a third user input corresponding to a third media record is activated while the first user input remains activated, to select the third media record and to combine the first media record, the at least one second media record, and the third media record into the one combined media record and to store the one combined media record into the memory.

27. The apparatus according to claim 24, said controller further configured to cause a first acoustic signal to be generated in response to the user activating said first user input, to cause a second acoustic signal to be generated in response to the user activating said second user input, and to cause a third acoustic signal to be generated in response to the user simultaneously activating said first user input and said second user input for a predetermined period of time.

28. The apparatus according to claim 23, where the first media record is selected by the user activating a first user input of said user input device, the first user input corresponding to a first location on said display showing an indication of said first record, where the second media record is selected by the user activating a second user input of said user input device, the second fuser input corresponding to a second location on aid display showing an indication of said second media record, and where said controller is further configured to respond to a condition where both the first and the second user inputs are simultaneously activated for a predetermined period of time to select a further media record or media records having indications shown at locations between the first location and the second location.

29. The apparatus according to claim 23, where the first media record is selected by the user activating a first user input of said user input device, the first user input corresponding to a first identifier associated with said first media record, where the second media record is selected by the user activating a second user input of said user input device, the second user input corresponding to a second identifier associated with said second media record, where the first identifier and the second identifier comprise part of a sequence of identifiers, and where said controller is further configured to respond to a condition where both the first and the second user inputs are simultaneously activated for a predetermined period of time to select a further media record or media records having identifiers in the sequence between the first identifier and the second identifier and to combine into the one media record the first media record, the second media record, and the further media record or media records.

30. The apparatus according to claim 29, where the identifiers comprise numbers, and where the indications are shown on said display in numerical order.

31. The apparatus according to claim 23, where a media record is comprised of at least one of text, image, recording, video or animation.

32. The apparatus according to claim 23, further comprising a transmitter and a receiver.

33. The apparatus according to claim 32, where said transmitter and said receiver are configured to operate with a cellular communication network via an antenna.

34. The apparatus according to claim 23, where the memory comprises a part of said apparatus.

35. The apparatus according to claim 23, where the memory is disposed external to said apparatus.

36. The apparatus according to claim 23, further comprising a transmitter and a receiver, where the memory is disposed external to said apparatus and where said controller is coupled to said memory via said transmitter and said receiver.

37. The apparatus according to claim 23, where said user input device is comprised of a keyboard having physical keys.

38. The apparatus according to claim 23, where said user input device is comprised of a touch screen.

39. The apparatus according to claim 23, where said user interface is comprised of a projection display.

* * * * *

UNITED STATES PATENT AND TRADEMARK OFFICE
CERTIFICATE OF CORRECTION

PATENT NO.        : 7,660,593 B2                                                Page 1 of 1
APPLICATION NO.   : 11/026885
DATED             : February 9, 2010
INVENTOR(S)       : Mustonen et al.

It is certified that error appears in the above-identified patent and that said Letters Patent is hereby corrected as shown below:

In Claim 7: Column 6, line 22, delete "include" and insert -- included --.

In Claim 9: Column 6, line 35, delete "a" and insert -- one --.

In Claim 15: Column 7, line 18, delete "on the" and insert -- on a --.

Also in Claim 15: Column 7, line 18, delete "terminal device" and insert -- apparatus --.

In Claim 17: Column 7, line 30, delete "a" and insert -- one --.

In Claim 18: Column 7, line 42, delete "the" and insert -- a --.

Also in Claim 18: Column 7, line 46, delete "the" and insert -- a --.

In Claim 20: Column 7, line 63, delete "the" and insert -- a --.

In Claim 21: Column 8, line 3, delete "key" and insert -- keys --.

In Claim 26: Column 8, line 34, after "claim 24" insert -- where --.

In Claim 28: Column 8, line 56, after "said first" insert -- media --.

Also in Claim 28: Column 8, line 58, delete "fuser" and insert -- user --.

Also in Claim 28: Column 8, line 59, delete "aid" and insert -- said --.

Signed and Sealed this

Thirtieth Day of March, 2010

David J. Kappos
*Director of the United States Patent and Trademark Office*